US005624469A

United States Patent [19]

Isaksson et al.

[11] Patent Number: 5,624,469
[45] Date of Patent: Apr. 29, 1997

[54] METHOD AND APPARATUS FOR RECOVERING HEAT FROM SOLID MATERIAL SEPARATED FROM GASIFICATION OR COMBUSTION PROCESSES

[75] Inventors: Juhani Isaksson, Karhula; Harry Ollila, Kauniainen, both of Finland

[73] Assignee: Foster Wheeler Energia Oy, Helsinki, Finland

[21] Appl. No.: 768,729

[22] PCT Filed: Apr. 11, 1990

[86] PCT No.: PCT/FI90/00104

§ 371 Date: Oct. 11, 1991

§ 102(e) Date: Oct. 11, 1991

[87] PCT Pub. No.: WO90/12253

PCT Pub. Date: Oct. 18, 1990

[30] Foreign Application Priority Data

Apr. 13, 1989 [FI] Finland .................................. 891748

[51] Int. Cl.[6] ........................................................ C10J 3/72
[52] U.S. Cl. ........................... 48/87; 48/73; 48/77; 48/210; 48/202; 422/139; 422/145; 422/147
[58] Field of Search ........................... 48/87, 202, 197 R, 48/203, 206, 210, 73, 76, 77, 63, 64; 422/139, 143, 145, 146, 147; 122/DIG. 7

[56] References Cited

U.S. PATENT DOCUMENTS

| | | | |
|---|---|---|---|
| 2,782,913 | 1/1957 | Donath | 206/221 |
| 4,111,158 | 9/1978 | Reh et al. | 122/48 |
| 4,244,706 | 1/1981 | Forney et al. | 48/202 |
| 4,276,021 | 6/1981 | Karnofsky et al. | 432/85 |
| 4,461,629 | 7/1984 | Arisaki | 48/202 |
| 4,542,621 | 9/1985 | Andersson et al. | 62/534 |

*Primary Examiner*—Esther Kepplinger
*Assistant Examiner*—Lien Tran
*Attorney, Agent, or Firm*—Nixon & Vanderhye P.C.

[57] ABSTRACT

Heat is recovered from the hot solids discharged from the combustion chamber of a fluidized bed reactor. Hot solid particles as a result of combustion are removed either in the form of ash, or particles separated from a gas stream, and are passed into indirect heat exchange relationship with water, producing hot water. The hot water is mixed with fuel or other solid material to simultaneously heat and moisten the solid material (e.g. to a moisture content of 15-50%). The heated and moistened solid material is then fed into the combustion chamber, along with fluidizing air, to establish a fluidized bed in which combustion takes place. The heat exchange may take place in a closed heat exchange vessel, and the cooled solid particles may be discharged from the vessel through a pressure reduction valve.

16 Claims, 2 Drawing Sheets

METHOD AND APPARATUS FOR RECOVERING HEAT FROM SOLID MATERIAL SEPARATED FROM GASIFICATION OR COMBUSTION PROCESSES

BACKGROUND AND SUMMARY OF THE INVENTION

The present invention relates to a method and apparatus for recovering heat from solid material discharged from hot processes such as combustion or gasification processes and/or from cleaning processes of hot gases. In particular, the invention relates to the reuse of recovered heat in hot processes, and more specifically, it is suitable for recovering heat from the ashes of gasification or combustion processes.

Handling of the ashes derived from the combustion and gasification processes is problematic. For one thing, the hot ash has to be cooled before storing, and for another, spreading of ash and especially the finest ash particles after cooling causes environmental hazards.

Efforts have been made to get rid of fine ash by agglomerating it by means of heating such either in a combustion chamber or in a separate agglomerating means, whereby the ash released from the process becomes more applicable to storage.

It has also been suggested to use ash for drying of fuel. For example, Swedish patent application 8501563-4 discloses mixing of hot ash with fuel prior to feeding the fuel into a combustion chamber. In this case, the moisture possibly contained in the fuel is either absorbed in the ash or evaporates. The fuel becomes drier and it is easier to handle in the equipment constructed for treating conventional dry material. At the same time, however, the quantity of ash circulating in the process becomes greater, which is less desirable in terms of energy economy.

Efforts have also been made to cool and agglomerate ash by mixing water therewith in order to receive ash which is more appropriate for storage, such as is disclosed in DE patent specification 31 01 847. In this disclosure, the cooling water constitutes a problem because the temperature of the water is low, it is difficult to utilize its heat. Depending on the method of cooling and amounts of water, the temperature of the cooling water of ash is generally below 200° C. The water is too cold to be added in the steam circuit. On the other hand, the temperature of the cooling water is not much different from the temperature of the boiler water. Therefore, the cooling water cannot be used for heating of the boiler water with means of reasonable size. Discharging of water and not utilizing its heat is not a good solution either in terms of heat economy.

It is known from U.S. Pat. No. 4,244,706 a gasification process where both gaseous and solid products from the gasification are simultaneously cooled by direct heat exchange with water in a char cooling -device. Thus cooled product gas and vaporized water are separated from the solids and further cooled in order to condensate water and organic materials such as phenols and other aromatics, which are to be recycled. Cooling is accomplished by indirect heat transfer in a heat exchanger. The cooled condensate is mixed with fresh make-up water and thereafter mixed with coal in a mixing tank. The resulting mixture is preheated before being introduced into the gasifier.

It is known through U.S. Pat. No. 4,111,158 a method to cool bed material discharged from a fluidized bed reactor in order to control the bed temperature in the fluidized bed reactor. The bed material is discharged from the reactor into a heat exchanger where the material is cooled indirectly. The cooled bed material is thereafter recycled into the fluidized bed reactor.

The solids required for gasification and combustion processes have to be fed undisturbed into the combustion chamber and in such a manner that the various substances are distributed as evenly as possible over the cross sectional area of the entire combustion chamber. Feeding of dry, fine material, for example, into a pressurized combustion chamber calls for rather complicated equipment. Conveyance of dry material in the pipework prior to feeding it into the combustion chamber is both energy-consuming and difficult. For example, transfer of fine coal causes dusting and the fine coal itself is clearly explosive.

To avoid the above-mentioned drawbacks, moistening of coal prior to feeding thereof into the combustion chamber has been suggested. Finnish patent application 865217 discloses a method of mixing water with slack. Water is mixed with the slack to such an extent as to form a pumpable mass. This coal paste can be pumped with a pump without any additional treatment directly to the combustion stage.

An object of the present invention is to provide a method of recovering heat from solids discharged from hot processes, which method is superior in terms of the heat recovery to the methods described above. Another object of the invention is to provide an advantageous method of bringing the discharged solids into a form suitable for further treatment.

A still further object of the present invention is to provide an improved method of treating the feed material of the gasification or combustion process prior to feeding such feed material to a combustion or gasification reactor.

To gain the objects described above, the method of the invention, in which heat is recovered from hot solids separated from hot processes, includes following steps solid feed material, such as solid fuel or additive for the process, and fluidizing gas, such as air is fed into the combustion chamber, process gas formed in the combustion chamber is discharged from the upper part of the combustion chamber and hot solid material, such as ash formed in the combustion chamber or other solid bed material being fluidized in the combustion chamber is discharged from the bottom part of the combustion chamber, through discharge means or separated from process gas and discharged from the process in a hot gas cleaning means, and conducted via a channel into a heat exchanger, where the hot solid material is brought into indirect heat exchange contact with water flowing through a conduit in the heat exchanger for transferring heat from the hot solid material into the water, thereby providing hot water, hot water, thus formed in indirect heat exchange contact with substantially only discharged hot solid material, is conveyed uncooled from the heat exchanger through a conduit into a mixing chamber and mixed with solid feed material in the mixing chamber;

the solid feed material is simultaneously heated and moistened by mixing it with the hot water in the mixing chamber and the heated and moistened solid feed material is conveyed from the mixing chamber through a conduit into the combustion chamber.

The apparatus for recovering heat in accordance with the invention comprises a solid feed material conduit for feeding solids into the combustion chamber, fluidizing gas openings in the bottom grate of the combustion chamber for fluidizing solid material in the combustion chamber, a discharge pipe in the upper part of the combustion chamber, for discharging process gas from the combustion chamber, discharge means in the bottom part of the combustion chamber for discharging hot solid material from the combustion chamber and/or discharge means for discharging hot solid material separated from the hot process gases in a hot gas cleaning means, a heat exchanger connected to the discharge means for receiving the discharged hot solid material, a conduit in the heat exchanger for leading water through the heat exchanger in indirect heat exchange contact with the discharged hot solid material and for transferring heat from the hot solid material to the water, means for removing cooled solid material from the heat exchanger, a mixing chamber connected to the solid feed material conduit, means for introducing solid feed material into the mixing chamber and a conduit connecting the heat exchanger directly to the mixing chamber for feeding hot uncooled water from the heat exchanger into the mixing chamber for moisturing and heating the solid feed material in the mixing chamber.

The present invention is suitable for recovering heat from the ashes of gasification or combustion processes, such as fly ash being continuously separated in the gas cleaning means. The invention is also suitable for recovering heat from bed material discharged from the combustion chambers of fluidized bed reactors. The bed material generally contains mainly ash and inert solid material such as sand. The bed material may also contain some additive, such as sulphur-binding calcium compounds, fed into the process. Bed material is removed either continuously or intermittently from the reactor for maintaining suitable process conditions in the reactor. Because the material to be discharged is hot, it usually has to be cooled prior to further treatment thereof.

In the method of the invention, the fluid used as a heat exchange medium is preferably water. Mixed with the feed material, it is well applicable to be fed into a hot process. Depending on the process and temperatures, some other fluid may also be used.

In accordance with the invention, hot solid material can be introduced either into an open fluid tank such as, for example, a water tank disposed below the combustion chamber of the reactor, or into a closed water tank. In a closed water tank, hot solid material effects vaporization of water, and it can be led forward in the evaporated form. Vapor is readily transported even over long distances. When vapor is brought into contact with colder feed material such as, for example, slack, it will condense onto the surface of the coal particles thus heating the coal and forming a coal paste suitable for feeding thereof into the combustion chamber.

Liquid is according to the invention brought into an indirect heat exchange contact with removed solid material.

When the invention is applied in respect of gasifiers or boilers in which coal is gasified or combusted, heated liquid or possibly steam is mixed with coal, preferably to such an extent as to produce coal paste which is easy to treat and handle. Increasing the moisture of coal to 15–50% facilitates its transportation by pumping even longer distances and enables simple feeding thereof even into a pressurized combustion chamber. Feeding can be effected by fairly simple means. Raising of the moisture content prevents dusting of coal and considerably reduces its susceptibility to explode.

BRIEF DESCRIPTION OF THE DRAWINGS

The invention is further described in more detail below, by way of example, with reference to the accompanying drawings, in which.

DETAILED DESCRIPTION OF THE DRAWINGS

Figure 1:
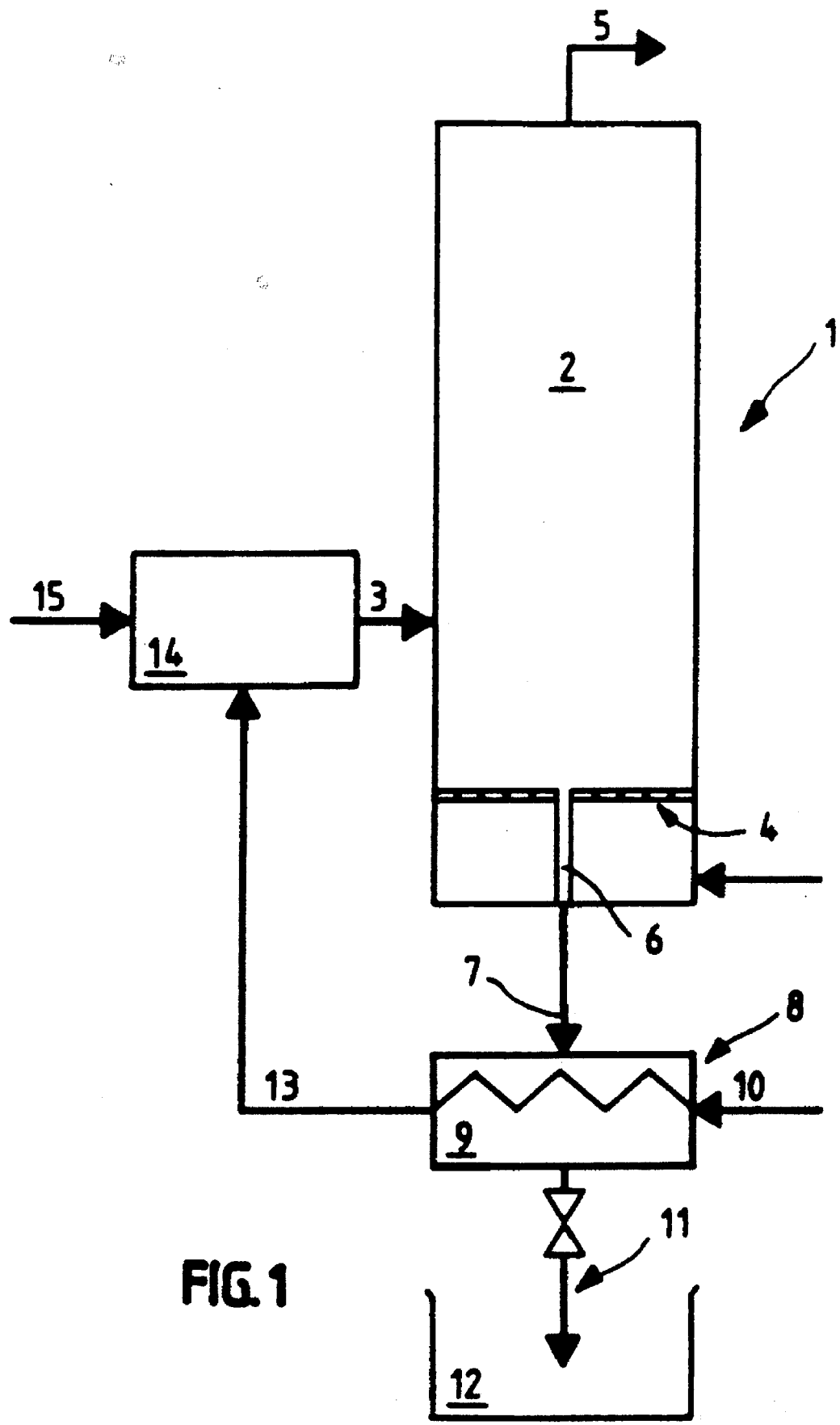
FIG. 1 is a schematic illustration of an embodiment of the invention.

The embodiment according to FIG. 1 is applied to heat recovery from ash which has been removed from the pressurized combustion chamber 2 of a fluidized bed reactor 1, and to heat recovery from other possible bed material. In this embodiment, Water is used as the medium of heat recovery. The heated water is further utilized for adjusting the temperature and composition of the fuel in the fluidized bed reactor.

A fluidized bed is maintained in the combustion chamber 2 of the fluidized bed reactor 1 by introducing fluidizing gas, such as air, through openings in a bottom grid 4 into the combustion chamber. Fluidizing gas can, of course, be fed also by other generally used air feed means such as air nozzles, disposed at the bottom of the combustion chamber. The process gas is removed from the upper part of the combustion chamber by a gas discharge pipe 5. Fuel such as, for example, coal is introduced into the combustion chamber through a conduit 3. The combustion chamber can be arranged with several fuel feeding conduits if necessary. Furthermore, the combustion chamber can be provided with various conduits, not shown in the figure, for introducing bed material or additive into the process.

Ash and other solid material possibly discharged from the bed are removed from the bottom part of the combustion chamber by a discharge means 6. The ash discharged from the combustion chamber is conducted via channel 7 into a heat exchanger 8, which comprises a chamber 9. In the chamber, in the embodiment according to the FIG. 1, the ash is brought into indirect heat exchange contact with liquid flowing through conduit 10, which liquid may be, for example, water. The cooled ash is conveyed from chamber 9 through conduit 11 and through pressure reduction valve to a storage tank.

The water heated in the heat exchanger is introduced through a conduit 13 into a mixing chamber 14, where water is mixed with fuel 15. The fuel may be pulverized coal or slack. Heated water is mixed with the fuel, preferably to such an extent that the moisture content of the fuel will rise to 15–20%, whereby an easily pumpable paste is formed by, for example, coal. The mixing chamber is connected to a fluidized bed reactor by means of the conduit 3.

The invention is applicable to both unpressurized and pressurized combustion or gasification processes. Feeding of ash from a pressurized combustion chamber can be simply arranged in a pressurized state into a pressurized heat exchanger. When cooled, the ash can easily be led through the pressure reduction valve into a storage tank 12.

In some applications, it may be preferable to locate the pressure reduction valve between the combustion chamber and the heat exchanger and to arrange the cooling of ash at atmospheric pressure.

Figure 2:
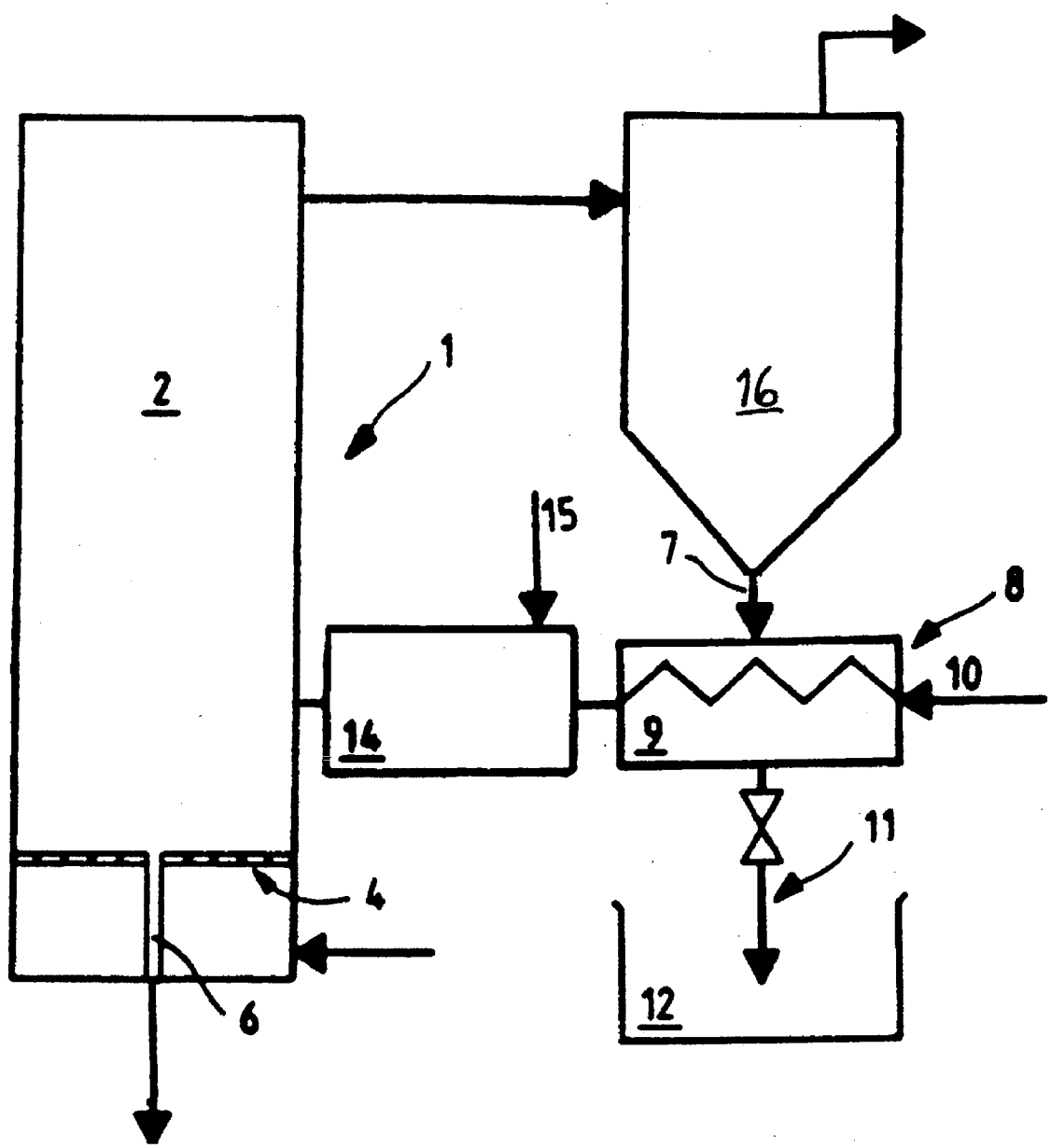
FIG. 2 is a schematic illustration of a second embodiment of the invention.

In the method according to FIG. 2, the invention is applied to recovering heat from fly ash. The gas from the fluidized bed reactor 2 is cleaned in means 16. The fly ash is introduced via conduit 7 to the heat exchanger 8. As in the previous embodiment, the heat of the ash is recovered in a liquid, which is introduced to the mixing chamber 14 for moistening and preheating the fuel to be fed into the process.

In particular, the heat contained in the fly ash has been difficult to utilize because the amounts of fly ash are small and the heat content of fly ash is lower than, for example, that of the bottom ash of the reactor. The method according to the invention now makes possible also the utilization of the heat of the fly ash.

We claim:

1. A method for recovering heat from hot solids discharged from the combustion chamber of a fluidized bed reactor, comprising the steps of:

(a) feeding solid material, including fuel, and fluidizing gas into the combustion chamber to establish a fluidized bed which produces hot gases and solid particles;

(b) removing the hot solid particles from the combustion chamber;

(c) passing the hot solid particles into indirect heat exchange relationship with water, to thereby produce hot water;

(d) mixing the hot water with the solid material to simultaneously heat and moisten the solid material; and (e) using the heated and moistened solid material from step (d) for at least a part of the solid material in step (a).

2. A method as recited in claim 1 wherein steps (a), (d), and (e) are practiced to provide a moisture content of the feed material of 15–50%, and wherein steps (a) and (e) are practiced by pumping the feed material into the combustion chamber.

3. A method as recited in claim 2 wherein step (b) is practiced by removing hot solid particles from the hot gases produced during combustion.

4. A method as recited in claim 2 wherein step (b) is practiced by discharging ash from a bottom portion of the combustion chamber.

5. A method as recited in claim 4 wherein step (c) is practiced by passing the ash into a closed heat exchange vessel, and passing the water through the vessel in a closed heat exchange conduit.

6. A method as recited in claim 5 comprising the further step of discharging and reducing the pressure of the ash from the vessel after it has been cooled by the water flowing in the heat exchange conduit.

7. A method as recited in claim 2 wherein steps (d), (e), and (a) are practiced using pulverized coal as the solid material.

8. A method as recited in claim 1 wherein step (b) is practiced by removing hot solid particles from the hot gases produced during combustion.

9. A method as recited in claim 1 wherein step (b) is practiced by discharging ash from a bottom portion of the combustion chamber.

10. A method as recited in claim 9 wherein step (c) is practiced by passing the ash into a closed heat exchange vessel, and passing the water through the vessel in a closed heat exchange conduit.

11. A method as recited in claim 10 comprising the further step of discharging and reducing the pressure of the ash from the vessel after it has been cooled by the water flowing in the heat exchange conduit.

12. A method as recited in claim 1 wherein steps (d), (e), and (a) are practiced using pulverized coal as the solid material.

13. A fluidized bed reactor assembly comprising:

a fluidized bed reactor having a combustion chamber, an ash discharge from the combustion chamber, and a gas discharge from the combustion chamber, fuel being combusted in the combustion chamber to produce hot gases and solid particles;

means for withdrawing hot solid particles from the combustion chamber;

a heat exchange vessel operatively connected to said means for withdrawing hot solid particles from the combustion chamber;

a heat exchange conduit passing through said heat exchange vessel for transporting water through said heat exchange vessel;

a cooled particles discharge from said heat exchange vessel;

a mixing chamber;

means for feeding solid material into said mixing chamber;

means for connecting said heat exchange conduit to said mixing chamber, for introducing hot water from said heat exchange conduit into said mixing chamber; and means for feeding solid material mixed with water from said mixing chamber into the combustion chamber.

14. A system as recited in claim 13 further comprising a pressure reduction valve connected to said cooled particles discharge from said heat exchange vessel.

15. A system as recited in claim 13 wherein said means for withdrawing hot solid particles from the combustion chamber comprises a gas/particles separator connected to the gas discharge from said combustion chamber.

16. A system as recited in claim 13 wherein said means for withdrawing hot solid particles from the combustion chamber comprises said ash discharge, said ash discharge directly connected to said heat exchange vessel.

* * * * *